US012587529B2

(12) United States Patent
Solnik et al.

(10) Patent No.: US 12,587,529 B2
(45) Date of Patent: Mar. 24, 2026

(54) METHODS AND SYSTEMS FOR SECURITY ENHANCEMENT IN ARTIFICIAL INTELLIGENCE MODEL INTERACTIONS VIA AUTOMATED INJECTION AND PROXY SERVER IMPLEMENTATION

(71) Applicant: WitnessAI, Inc., Mountain View, CA (US)

(72) Inventors: Mathew Solnik, Dallas, TX (US); Samuel Kimama, Daly City, CA (US); Gil Spencer, Incline Village, NV (US); Jeffrey Dean Walter, San Antonio, TX (US)

(73) Assignee: WitnessAI, Inc., Mountain View, CA (US)

( * ) Notice: Subject to any disclaimer, the term of this patent is extended or adjusted under 35 U.S.C. 154(b) by 0 days.

(21) Appl. No.: 18/829,021

(22) Filed: Sep. 9, 2024

(65) Prior Publication Data

US 2026/0075055 A1 Mar. 12, 2026

(51) Int. Cl.
*H04L 9/40* (2022.01)

(52) U.S. Cl.
CPC .............. *H04L 63/10* (2013.01); *H04L 63/20* (2013.01)

(58) Field of Classification Search
CPC ................................ H04L 63/10; H04L 63/20
USPC .......................................................... 726/30
See application file for complete search history.

(56) References Cited

U.S. PATENT DOCUMENTS

| | | | |
|---|---|---|---|
| 10,728,117 B1 * | 7/2020 | Sharma | ............... H04L 41/5067 |
| 12,045,610 B1 | 7/2024 | Myers et al. | |
| 2007/0289010 A1 | 12/2007 | Thomas et al. | |
| 2014/0123325 A1 | 5/2014 | Jung et al. | |
| 2015/0381649 A1 | 12/2015 | Schultz et al. | |
| 2017/0214708 A1 | 7/2017 | Gukai et al. | |
| 2018/0248893 A1 | 8/2018 | Israel et al. | |
| 2018/0367561 A1 | 12/2018 | Givental et al. | |
| 2020/0372075 A1 | 11/2020 | Rogynskyy et al. | |
| 2023/0084202 A1 | 3/2023 | Patil et al. | |
| 2023/0370495 A1 | 11/2023 | Desai et al. | |
| 2023/0418943 A1 | 12/2023 | Han et al. | |
| 2024/0022603 A1 | 1/2024 | Melson et al. | |
| 2024/0205237 A1 | 6/2024 | Tormasov et al. | |
| 2024/0394400 A1 | 11/2024 | Smith | |
| 2025/0005060 A1 | 1/2025 | Phiri et al. | |

(Continued)

*Primary Examiner* — Anthony D Brown
(74) *Attorney, Agent, or Firm* — Carr & Ferrell LLP; James M. Nachtwey

(57) ABSTRACT

The present technology relates to a computer-implemented method for enhancing enterprise-wide security when using Artificial intelligence (AI) models. Embodiments involve a JavaScript injection process facilitated by a proxy server. This process does not require manual installation as it is automatically injected during operation. The JavaScript injection process operates by intercepting unsecured AI input and output data provided by users interacting with AI websites. The input and output data are sent to a security Application Programming Interface (API) which applies an enterprise security policy to the data in real-time, thereby transforming unsecured input and output into secure data. Embodiments provide a robust framework for safe interaction with Artificial intelligence models while mitigating the risks associated with the transmission of sensitive information over the internet.

23 Claims, 5 Drawing Sheets

(56) References Cited

U.S. PATENT DOCUMENTS

| | | | |
|---|---|---|---|
| 2025/0112963 A1* | 4/2025 | Kfir | G06F 40/205 |
| 2025/0139367 A1 | 5/2025 | Manandise et al. | |
| 2025/0148308 A1 | 5/2025 | Vinay et al. | |
| 2025/0232190 A1 | 7/2025 | Baughman et al. | |
| 2025/0267171 A1 | 8/2025 | Sharma et al. | |
| 2025/0284805 A1 | 9/2025 | Hen et al. | |
| 2025/0307418 A1 | 10/2025 | Spencer et al. | |

* cited by examiner

100

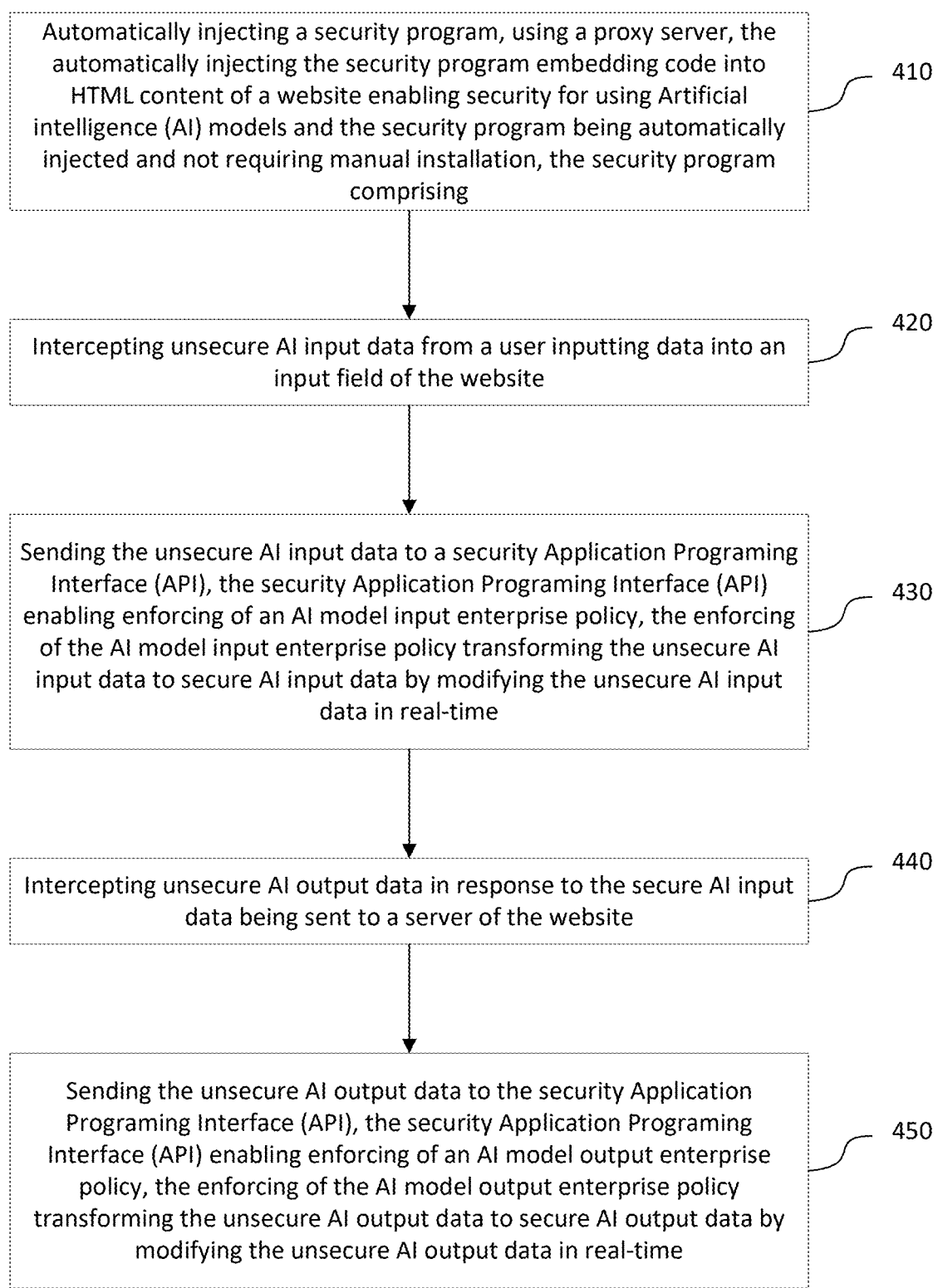

Automatically injecting a security program, using a proxy server, the automatically injecting the security program embedding code into HTML content of a website enabling security for using Artificial intelligence (AI) models and the security program being automatically injected and not requiring manual installation, the security program comprising                    410

Intercepting unsecure AI input data from a user inputting data into an input field of the website                    420

Sending the unsecure AI input data to a security Application Programing Interface (API), the security Application Programing Interface (API) enabling enforcing of an AI model input enterprise policy, the enforcing of the AI model input enterprise policy transforming the unsecure AI input data to secure AI input data by modifying the unsecure AI input data in real-time                    430

Intercepting unsecure AI output data in response to the secure AI input data being sent to a server of the website                    440

Sending the unsecure AI output data to the security Application Programing Interface (API), the security Application Programing Interface (API) enabling enforcing of an AI model output enterprise policy, the enforcing of the AI model output enterprise policy transforming the unsecure AI output data to secure AI output data by modifying the unsecure AI output data in real-time                    450

FIG. 4

METHODS AND SYSTEMS FOR SECURITY ENHANCEMENT IN ARTIFICIAL INTELLIGENCE MODEL INTERACTIONS VIA AUTOMATED INJECTION AND PROXY SERVER IMPLEMENTATION

CROSS REFERENCE TO RELATED APPLICATIONS

This patent application is related to U.S. patent application Ser. No. 18/622,686 filed on Mar. 29, 2024 and titled "Secure Systems of Guardrails for Securing the Use of Large Language Models (LLMS)" which is hereby incorporated by reference in its entirety for all purposes.

FIELD OF THE INVENTION

Embodiments of the disclosure relate to cybersecurity and data protection, and more particularly to a computer-implemented method for enhancing the security of input and output data when interacting with Artificial Intelligence (AI) models through websites, specifically those that utilize AI capabilities in enterprise environments.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

In recent years, there has been significant growth in the deployment and use of Artificial intelligence (AI) models, such as those used for natural language processing, machine learning, and other Artificial Intelligence (AI) tasks. These models have become integral in providing advanced services on various websites by understanding user-generated content and providing relevant and sophisticated responses or actions.

However, the widespread use of AI models has brought forth numerous security challenges. One primary concern is the risk of sensitive data exposure such as personal identifiable information (PII) when users interact with these AI-driven systems. Malicious entities can exploit vulnerabilities in communication or data processing to gain access to or tamper with sensitive data.

Enterprise environments often have stringent data security and privacy policies. Enforcing these policies becomes challenging, especially when interactions with AI models outside the enterprise's immediate control are necessary. Enterprises require robust mechanisms to ensure that data inputs into and outputs from AI models comply with security policies while maintaining real-time processing efficiency.

Previous approaches for securely using AI models have primarily focused on traditional encryption methods and secure communication protocols to protect sensitive data processed by AI models. These approaches typically involve encrypting data at rest and in transit, implementing secure authentication mechanisms, and utilizing secure sockets layer (SSL) or transport layer security (TLS) protocols to establish secure connections between clients and servers. While these methods provide a level of security for data transmission and storage, they do not address the specific challenges associated with securing the input and output data processed by AI models in real-time. Moreover, these solutions may not offer real-time data transformation capabilities to dynamically modify AI input and output data according to enterprise security policies. None of these approaches have provided a comprehensive solution that combines the features described in this disclosure.

This background section is intended to provide a brief overview of the field and related art associated with the present technology. It is generally recognized that the mention of any prior art in the background section is not an acknowledgment or admission that such prior art is widely known or forms part of the common general knowledge in the field.

SUMMARY OF THE INVENTION

Embodiments establish a robust security framework for organizations to safely leverage the capabilities of AI models while protecting against data breaches and maintaining compliance with security policies. The present technology includes a computer-implemented method that ensures enterprise-wide security when interacting with Artificial intelligence (AI) models on websites, particularly Artificial Intelligence (AI) websites. This is achieved, in some embodiments, by automatically deploying a JavaScript injection process via a proxy server. The injection process via a proxy server may include various programming languages that are used for adding interactivity to web pages. The process involves real-time interception and modification of insecure AI input and output data based on security policies, without the need for manual installation of software or browser extensions.

In some embodiments, the present technology relates to a computer-implemented method for securely using Artificial intelligence (AI) models, the computer-implemented method including: automatically injecting a security program, using a proxy server, the automatically injecting the security program embedding code into HTML content of a website enabling security for using Artificial intelligence (AI) models and the security program being automatically injected and not requiring manual installation, the security program including: intercepting unsecure AI input data from a user inputting data into an input field of the website; sending the unsecure AI input data to a security Application Programing Interface (API), the security Application Programing Interface (API) enabling enforcing of an AI model input enterprise policy, the enforcing of the AI model input enterprise policy transforming the unsecure AI input data to secure AI input data by modifying the unsecure AI input data in real-time; intercepting unsecure AI output data in response to the secure AI input data being sent to a server of the website; and sending the unsecure AI output data to the security Application Programing Interface (API), the security Application Programing Interface (API) enabling enforcing of an AI model output enterprise policy, the enforcing of the AI model output enterprise policy transforming the unsecure AI output data to secure AI output data by modifying the unsecure AI output data in real-time.

In some embodiments, the present technology relates to a computer-implemented method, wherein the modifying the unsecure AI input data in real-time uses a hook procedure, the hook procedure intercepting an API call and altering the unsecure AI input data.

In some embodiments, the present technology relates to a computer-implemented method, wherein the modifying the unsecure AI output data in real-time uses a hook procedure, the hook procedure intercepting an API call and altering the unsecure AI output data.

In some embodiments, the present technology relates to a computer-implemented method, wherein the modifying the unsecure AI input data in real-time uses a hidden overlay, the hidden overlay being above a content layer of the website; and further including displaying the secure AI input data to the user using the input field of the website and the hidden overlay.

In some embodiments, the present technology relates to a computer-implemented method, wherein the modifying the unsecure AI input data in real-time includes redacting personal identifiable information (PII) according to the AI model input enterprise policy.

In some embodiments, the present technology relates to a computer-implemented method, wherein the modifying the unsecure AI output data in real-time uses a hidden underlay, the hidden underlay being below a content layer of the website; and further including displaying the secure AI output data to the user using an output field of the website and the hidden underlay.

In some embodiments, the present technology relates to a computer-implemented method, wherein the modifying the unsecure AI output data in real-time includes redacting AI output data according to the AI input enterprise policy.

In some embodiments, the present technology relates to a computer-implemented method, wherein the security program is a JavaScript injection process, the JavaScript injection process being live, in real-time.

In some embodiments, the present technology relates to a computer-implemented method, further including dynamically discovering a configuration for each website including: comparing a website configuration to a prime library database; and selecting a website configuration based on the comparing.

In some embodiments, the present technology relates to a computer-implemented method, wherein the proxy server is configured to intercept and modify network traffic between the user and the server of the website.

In some embodiments, the present technology relates to a computer-implemented method, wherein the security Application Programming Interface (API) is configured to audit the unsecure AI input data and the unsecure AI output data for compliance with enterprise security policies.

In some embodiments, the present technology relates to a computer-implemented method, wherein the security program is configured to be updated automatically without user intervention.

In some embodiments, the present technology relates to a computer-implemented method, wherein the proxy server is configured to log all interactions between the user and the server of the website for security auditing purposes.

In some embodiments, the present technology relates to a computer-implemented method, wherein the security Application Programing Interface (API) is configured to detect and block malicious activities in real-time.

In some embodiments, the present technology relates to a computer-implemented method, wherein the security program is configured to provide real-time alerts to the user regarding potential security threats.

In some embodiments, the present technology relates to a computer-implemented method, wherein the security Application Programing Interface (API) is configured to generate reports on a security status of the AI input data and the AI output data.

In some embodiments, the present technology relates to a computer-implemented method, wherein the proxy server is configured to provide load balancing for handling multiple user requests simultaneously.

In some embodiments, the present technology relates to a computer-implemented method, wherein the security Application Programing Interface (API) is configured to perform real-time data analysis for detecting anomalies in the AI input data and the AI output data.

In some embodiments, the present technology relates to a computer-implemented method, wherein the security Application Programing Interface (API) is configured to provide real-time feedback to the user regarding a security status of the AI input data and the AI output data.

In some embodiments, the present technology relates to a computer-implemented method, wherein the website is an Artificial Intelligence (AI) website.

In some embodiments, the present technology relates to a computer-implemented method, wherein the modifying the unsecure AI input data in real-time uses a hook procedure, the hook procedure intercepting an API call and altering the unsecure AI input data.

In some embodiments, the present technology relates to a computer-implemented method, wherein the modifying the unsecure AI output data in real-time uses a hook procedure, the hook procedure intercepting an API call and altering the unsecure AI output data.

In some embodiments, the present technology relates to a computer-implemented method for securely using Artificial intelligence (AI) models, the computer-implemented method including: automatically injecting a JavaScript injection process, using a proxy server, the JavaScript injection process enabling enterprise-wide security for using Artificial intelligence (AI) models and the JavaScript injection process being automatically injected and not requiring manual installation, the JavaScript injection process including: intercepting unsecure AI input data, using the proxy server, from a user inputting data into an input field of Artificial Intelligence (AI) website; sending the unsecure AI input data to a security Application Programing Interface (API), the security Application Programing Interface (API) enabling enforcing of an AI input enterprise policy, the enforcing of the AI input enterprise policy transforming the unsecure AI input data to secure AI input data by modifying the unsecure AI input data in real-time; intercepting unsecure AI output data, using the proxy server, in response to the secure AI input data being sent to a server of the Artificial Intelligence (AI) website; and sending the unsecure AI output data to the security Application Programing Interface (API), the security Application Programing Interface (API) enabling enforcing of an AI output enterprise policy, the enforcing of the AI output enterprise policy transforming the unsecure AI output data to secure AI output data by modifying the unsecure AI output data in real-time.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

models by automatically injecting a security program using a proxy server, according to embodiments of the present technology.

Figure 3:
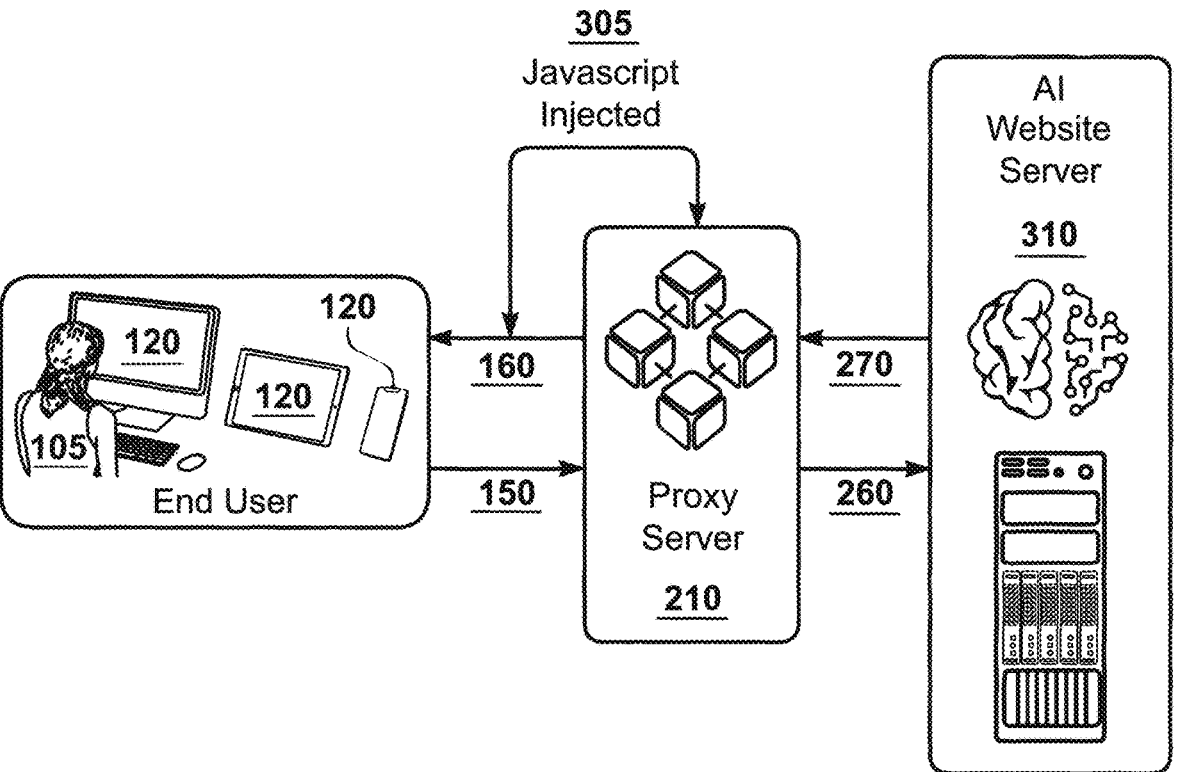

FIG. 3 illustrates a high-level block diagram for securely using Artificial intelligence (AI) models by automatically injecting a security program using a proxy server, according to embodiments of the present technology.

FIG. 4 depicts a process flow diagram for securely using Artificial intelligence (AI) models by automatically injecting a security program using a proxy server, according to embodiments of the present technology.

Figure 5:
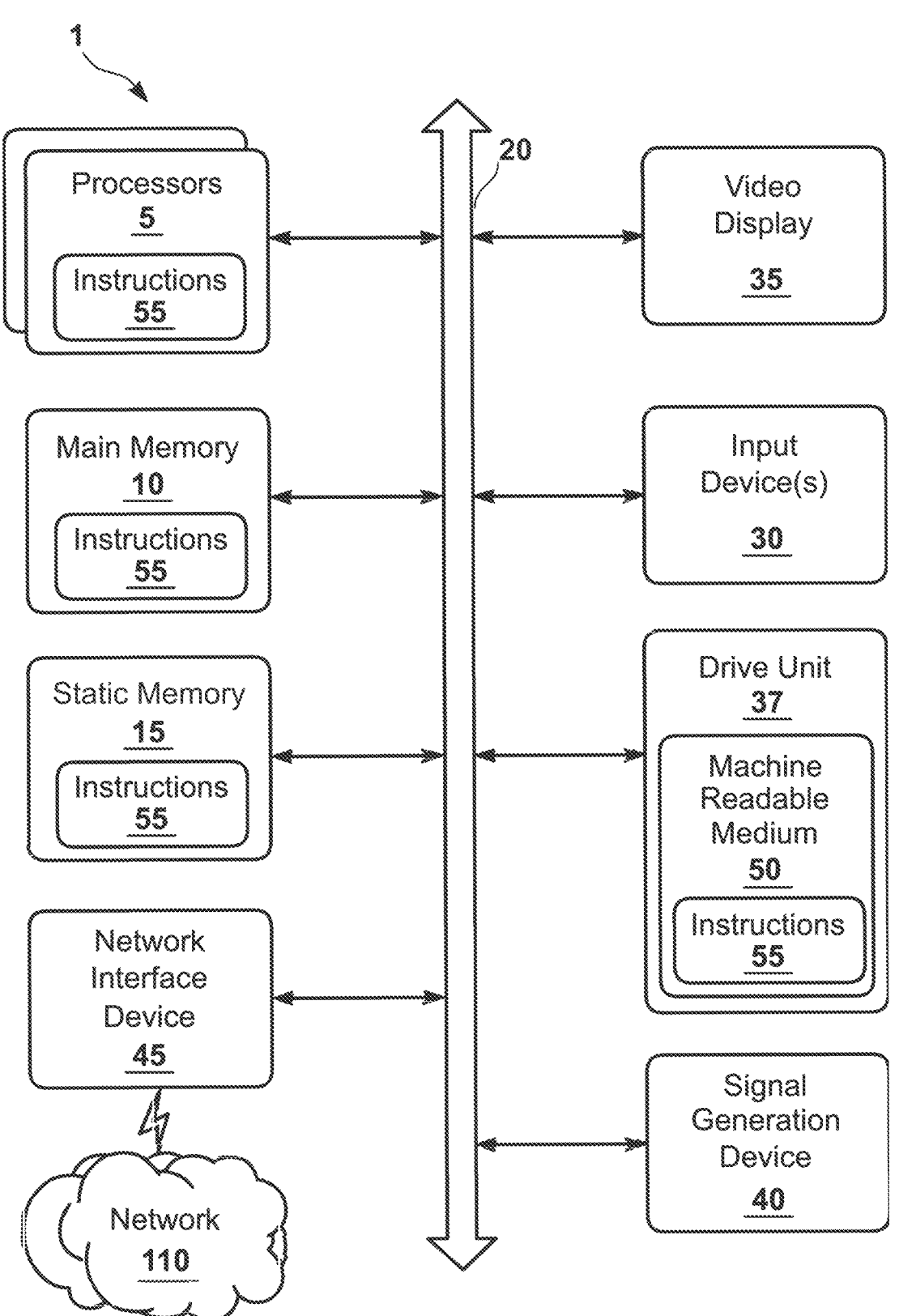

FIG. 5 illustrates an exemplary computer system that may be used to implement security for using Artificial intelligence (AI) models by automatically injecting a security program using a proxy server, according to embodiments of the present technology.

DETAILED DESCRIPTION

A detailed description of various embodiments of the present invention will be given below with reference to the accompanying drawings. In the following description of the present invention, when it is determined that a detailed description of a related well-known function or element may make the gist of the present invention unnecessarily vague, the detailed description will be omitted.

The present technology in various embodiments provides systems and methods for enhancing the security of generative AI applications within an enterprise environment. The innovation enables enterprises to safely leverage the benefits of generative AI by offering a seamless and automatic security program injection mechanism employing a proxy server. This approach streamlines the process of deploying updates and new functionality for security solutions, bypassing the inefficiencies associated with manual browser extension installations. The present technology ensures real-time modification and interaction with user content across all browser sessions enterprise-wide, enhancing control, privacy, and security.

In various embodiments, the security program injection mechanism is a JavaScript injection process. JavaScript is currently the most widely used language for client-side web development, but there are several alternatives and complementary technologies that can be used for similar purposes. In various embodiments the security program injection mechanism is in other programming languages. For example, but not limited to the following: WebAssembly (WASM): WebAssembly is a binary instruction format for a stack-based virtual machine. WASM is designed to be a portable compilation target for high-level languages like C, C++, and Rust, enabling deployment on the web for client and server applications. WebAssembly is known for its performance benefits and can be used alongside JavaScript. For example, the security program injection mechanism may use TypeScript, Dart, CoffeeScript, Elm, ClojureScript, Blazor, Google Web Toolkit (GWT), Kotlin/JS, ReasonML (ReScript), and the like. These alternatives offer various benefits, such as improved performance, better type safety, and different programming paradigms. The choice of technology depends on the specific requirements of the project, the team's expertise, and the desired features of the application. In various embodiments, the security program injection mechanism is referred to as JavaScript injection flow. The security program injection may use JavaScript but may also use any other programming language that accomplishes the functionalities disclosed by the present technology.

In the following paragraphs, the present invention will be described in detail by way of example with reference to the attached drawings. Throughout this description, the various embodiments and examples shown should be considered as exemplars, rather than as limitations on the present invention. As used herein, the "present invention" or "present technology" refers to any one of the embodiments of the invention described herein, and any equivalents. Furthermore, reference to various feature(s) of the "present invention" or "present technology" throughout this document does not mean that all claimed embodiments or methods must include the referenced feature(s).

The present invention now will be described more fully hereinafter with reference to the accompanying drawings, in which exemplary embodiments are shown. Various embodiments are now described with reference to the drawings, wherein reference numerals are used to refer to the same elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

The present invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying the present invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this present invention. Those of ordinary skill in the art further understand that the exemplary hardware, software, processes, methods, and/or operating systems described herein are for illustrative purposes and, thus, are not intended to be limited to any particular named manufacturer.

In various embodiments the present technology automatically injects JavaScript injection flow, updates and functionalities are automatically injected, negating the delay associated with traditional methods. The present technology allows real-time runtime configurability of security solutions without direct user intervention, offering universal compatibility with different internet browsers due to the universal nature of JavaScript. The system also features a dynamic discovery process for webpage configurations, ensuring optimal and up-to-date settings. Furthermore, the present technology operates partly off-network, providing continuous monitoring after the initial JavaScript injection process.

In some embodiments, for larger enterprises, the system can scale effectively by employing multiple proxy servers across diverse geographical regions. This architecture enhances the responsiveness and performance of the security solutions, enabling the management of a vast number of users and devices.

Some embodiments provide an innovative, efficient, and comprehensive security framework that addresses the challenges of rapid deployment, real-time data security, and configuration management for enterprise-wide generative AI applications.

Various embodiments provide a streamlined method for enhancing the security posture of an enterprise using generative AI by employing a proxy server architecture. Central to this architecture is the automatic injection of JavaScript code into the browser sessions of users within the enterprise network. This JavaScript code is tasked with implementing and ensuring compliance with the security policies of the enterprise in real-time.

Figure 1:
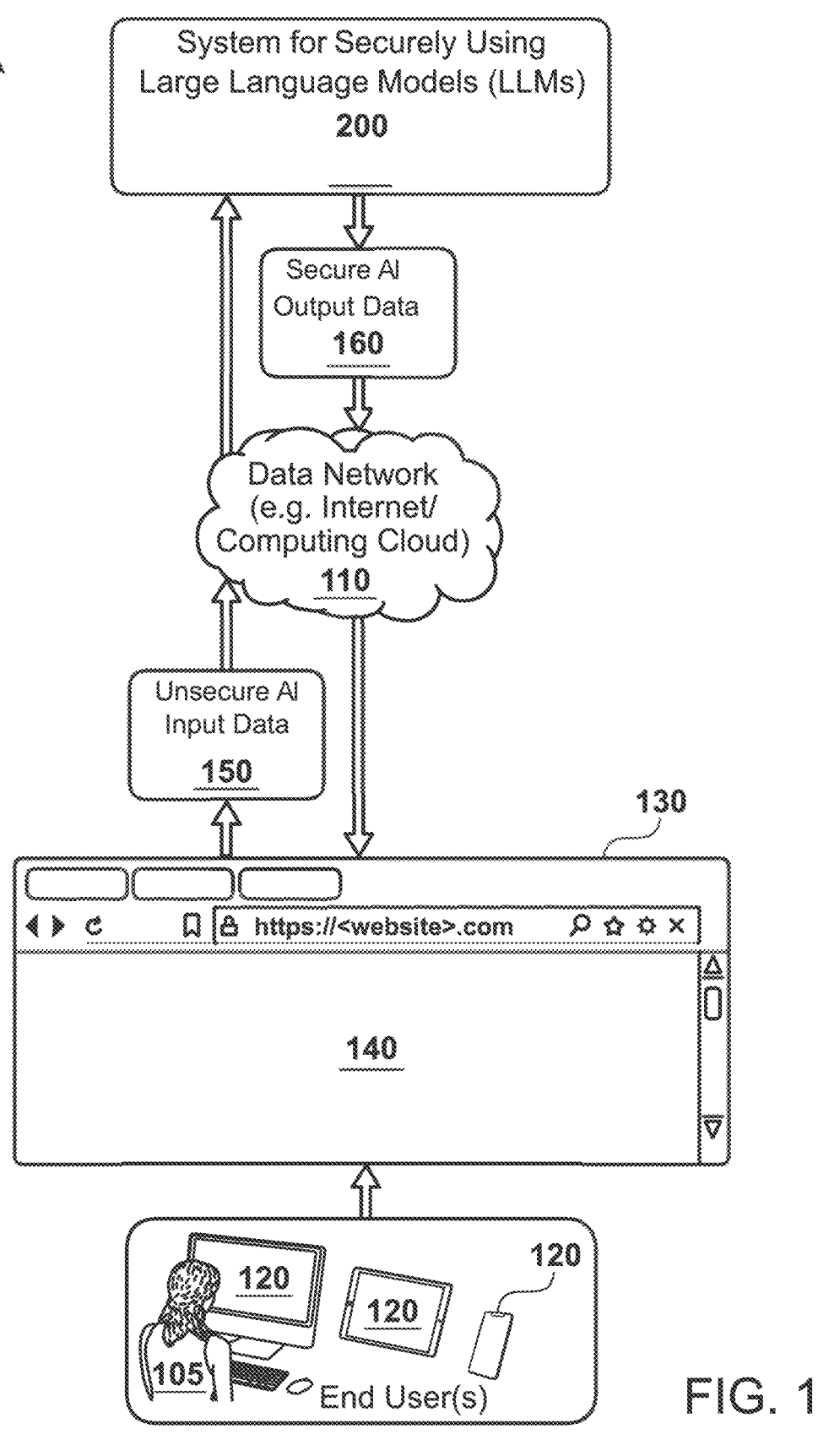
FIG. 1 illustrates a high-level block diagram of an exemplary environment configured for securely using Artificial intelligence (AI) models, according to embodiments of the present technology.

FIG. 1 illustrates a high-level block diagram of an exemplary environment configured for securely using AI models, according to embodiments of the present technology. Referring now to the drawings, FIG. 1 illustrates an environment 100 within which systems and methods for securely using AI models by automatically injecting a security program may be implemented, for example, a JavaScript injection process. The environment 100 may include a data network 110 (e.g., Internet or a computing cloud), end user(s) 105, client device(s) 120 (also referred to herein as user devices) associated with the end user(s) 105 (also referred to herein as users), and a system 200 of securely using an AI model by automatically injecting a JavaScript injection process using a proxy server.

Client device(s) 120 may include a personal computer (PC), a desktop computer, a laptop, a smartphone, a tablet, or so forth. The client device 120 may have a user interface 130. Furthermore, a web browser 140 (also referred to as browser 140) may be running on the client device 120 and displayed using the user interface 130. The web browser 140 may be directed to a website, via the data network 110, and the website may securely use an AI model, enabled by a proxy server automatically injecting a JavaScript injection process.

The data network 110 may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 (RS-232) serial connection, an IEEE-1394 (Fire Wire) connection, a Fiber Channel connection, an IrDA (infrared) port, a Small Computer Systems Interface connection, a Universal Serial Bus (USB) connection or other wired or wireless, digital, or analog interface or connection, mesh or Digi® networking.

In some embodiments the system 200 for securely using AI models by a proxy server automatically injecting a JavaScript injection process includes the proxy server that sits at the network layer and filters user traffic. The proxy server may receive encrypted data streams and decrypt the data streams for inspecting and filtering. For example, the proxy server enables decrypting of data traffic to enable looking for specific websites (e.g., OpenAI or Microsoft®) to which users are sending AI traffic. The proxy server further enables filtering the network protocol to retrieve user prompts into the application network protocol and searches for user prompts. The proxy server may be chained to other proxies or a plug-in to a third-party proxy server. Furthermore, a proxy version may be run stand alone on the network, on every end point, server-side, or client side in various embodiments. The present technology enables inspecting and filtering of prompts. For instance, inspection of prompts is important for applications such as web-based versions of Visual Studio or Microsoft Word® that have an AI/LLM Co-pilot built-in.

In some embodiments, a user may have written a chatbot or an application that uses Artificial intelligence (AI) models such as large language model (LLMs). Prompts from the chatbot or the application may be similarly inspected and filtered using the present technology via a proxy server automatically injecting a JavaScript injection process.

In various embodiments, the system 200 for securely using AI models by automatically injecting a JavaScript injection process may receive unsecure AI input data 150. The system 200 may ensure secure use of AI models by automatically injecting the JavaScript injection process. The system 200 may result in secure AI output data 160 by enforcing an AI output enterprise policy, transforming the unsecure AI output data to secure AI output data 160 by modifying the unsecure AI output data in real time.

Figure 2:
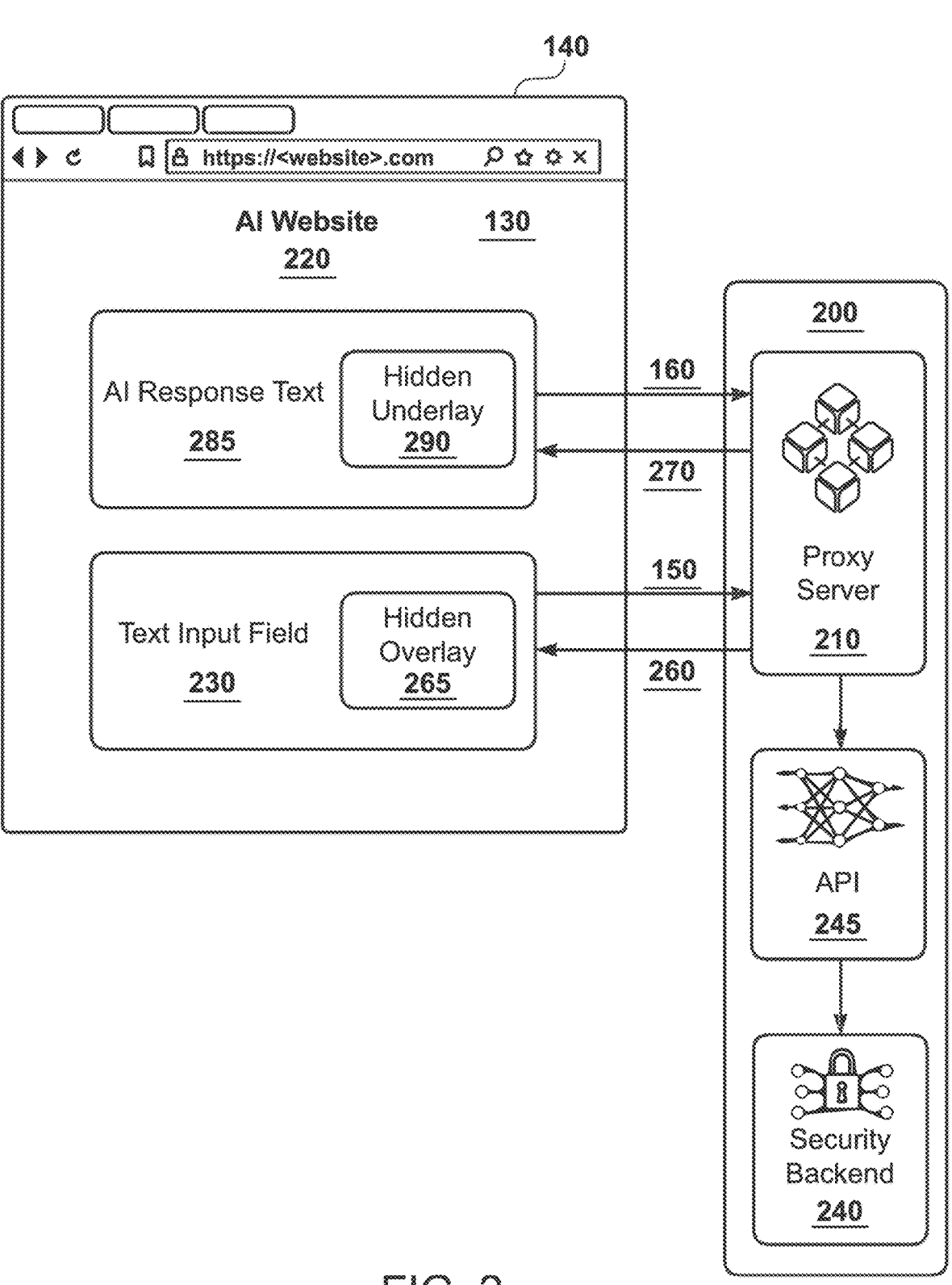
FIG. 2 illustrates a high-level block diagram of an exemplary system for securely using Artificial intelligence (AI)

FIG. 2 illustrates a high-level block diagram of an exemplary system for securely using Artificial intelligence (AI) models by automatically injecting a security program using a proxy server, according to embodiments of the present technology. In various embodiments, FIG. 2 illustrates the system architecture and interactions involved in securely using AI models by leveraging the proxy server 210 and the security API 245. The system ensures that both input and output data are intercepted, analyzed, and modified in real-time to comply with enterprise security policies, thereby mitigating the risks associated with the use of Artificial intelligence (AI) models such as LLMs.

According to some embodiments, the proxy server 210 facilitates real-time updates to security policies and JavaScript-based functionality. When changes need to be made, they can be implemented at the proxy server level, instantly propagating these updates to all affected browser sessions without the need for any action on the part of end-users or Informational Technology (IT) staff. This makes it possible to respond quickly to emerging threats or policy changes.

According to various embodiments, for enterprises with a substantial number of users or devices, the scalability of the system can be addressed through deploying multiple proxy servers strategically placed in various geographic regions or network segments. This arrangement ensures load balancing, thus preventing a single point of failure and providing reliable service despite high traffic volumes or distributed denial-of-service (DDOS) attacks.

According to some embodiments, using a centralized proxy server 210 in this manner allows for detailed logging and auditing of browser-based activities across the enterprise. This capability is important for compliance with various regulatory requirements, tracing the source of security incidents, and providing a comprehensive view of network usage. Since the system requires no installation on end-user devices, it supports a broad spectrum of devices and operating systems, inclusively encompassing bring-your-own-device (BYOD) policies without burdening IT resources.

According to various embodiments, scalability is an aspect of the present technology, which addresses the demands of large enterprises with numerous users and a wide distribution of devices across different geographic regions. To achieve this scalability, the embodiments incorporate a network of proxy servers, where each proxy server is strategically situated to serve a specific segment of the enterprise's network based on geographic location and user density.

In some embodiments, a function of employing multiple proxy servers is to distribute the load uniformly and minimize latency for users accessing the generative AI tools. By positioning proxy servers closer to the location of the users, the embodiments tap into the benefits of reduced data travel distance, which translates to faster response times and improved user experience. Each proxy server in the network is equipped to handle the JavaScript Injection Flow process, ensuring that the security features are applied consistently and universally, regardless of the location of the user within the enterprise.

According to various embodiments, the decentralized approach of some embodiments using a plurality of proxy servers enables the system to perform well under varying load conditions. For instance, during peak load times, traffic can be intelligently routed to ensure optimal performance without overburdening any single server. In the event of substantial usage spikes, the system can redirect excess traffic to other underutilized proxy servers in the network.

Another facet of the scalability feature is the ability to cater to the needs of enterprise expansion or contraction according to various embodiments. As the enterprise grows and more users or devices are added to the network, additional proxy servers can be seamlessly integrated into the existing architecture to maintain efficiency. Conversely, during periods of contraction, the network of proxy servers can be scaled down accordingly to optimize resource utilization and cost.

According to some embodiments, this network of proxy servers is designed to function in coordination with one another by sharing status updates, configuration changes, and security policies according to some embodiments. This collaborative nature ensures that each proxy server has access to the latest security updates and configurations, which helps maintain the integrity of the security solution across the entire enterprise.

In some embodiments, the deployment of a network of proxy servers can be customized based on the specific security needs and network topology of the enterprise. This customization may include varying degrees of security and JavaScript code injections tailored to regional requirements or compliance regulations, and considerations regarding local infrastructure.

In various embodiments, the scalability achieved by employing multiple proxy servers across different geographic regions equips the present technology with the flexibility and robustness required for enterprise-wide deployment. This facilitates the provision of uninterrupted, secure access to generative AI tools for all users within the enterprise, regardless of their physical location or the scale of the enterprise's operations.

According to some embodiments, when a user initiates a browser session on a client device (e.g., client devices 120) and navigates to an AI-driven website 220, the browser sends HTTP or HTTPS requests to the AI website server (e.g., AI website server 310). These HTTP or HTTPS requests are intercepted by the proxy server 210, which sits between the client device (e.g., client devices 120) and the AI website server (e.g., AI website server 310).

In some embodiments, upon intercepting the HTTP or HTTPS requests, the proxy server 210 injects JavaScript code into the HTML content of the website 220 before it is delivered to the user's browser 140. This JavaScript injection process is automatic and does not require any manual installation or intervention by the user. The injected JavaScript code operates seamlessly within the user's browser 140, providing real-time security enhancements.

In some embodiments, as the user interacts with the website 220, the JavaScript code monitors and intercepts unsecure AI input data 150 entered by the user into a website's input field 230. This intercepted data is sent to the security API 245, which enforces an AI input enterprise policy. The security API 245 transforms the unsecure AI input data 150 into secure AI input data 260 by modifying the unsecure AI input data 150 in real-time, ensuring that any sensitive or non-compliant data is appropriately handled before being processed by the AI model.

After the AI model processes the secure AI input data 260, the AI model generates unsecure AI output data 270, which is sent back to the user's browser. The JavaScript code, still active within the browser session, intercepts this unsecure AI output data 270 before it is displayed to the user. The intercepted unsecure AI output data 270 is sent to the security API 245, which enforces an AI model output enterprise policy. The security API 245 transforms the unsecure AI output data 270 into secure AI output data 160 by modifying the unsecure AI output data 270 in real-time, ensuring that any sensitive or non-compliant data is appropriately handled before being presented to the user.

In various embodiments, the secure AI output data 160 is then displayed to the user within the browser, providing a seamless and secure user experience. Throughout this process, the JavaScript code operates transparently, ensuring that the user is unaware of the security enhancements being applied in real-time.

In various embodiments, the security API 245 has been designed to enable applying of a set of predefined rules reflective of the enterprise's security policies by communicating with the security backend servers 240. These rules cater to a range of requirements, such as compliance with regulatory standards, adherence to data governance protocols, and the enforcement of internal data security measures. When the input data is received by the security API 245, it undergoes a rigorous process that may include validation checks, content analysis, and sanitization procedures. The present technology averts the submission of sensitive or classified information that could compromise privacy or security.

According to some embodiments, constancy of the security API's monitoring is critical in safeguarding each interaction with the AI model. With the security API 245 enabling modifying both inputs and outputs actively, the security API 245 leverages complex algorithms and heuristic analysis to preclude the exposure of sensitive data and to prevent real-time threats from propagating within the enterprise network. The dynamic nature of this real-time modification process ensures that the enterprise's security posture is proactive rather than reactive, allowing for immediate alignment with evolving security threats and emerging enterprise policies. Through continuous operation, the security API 245 facilitates a secure, real-time bridge between the enterprise users and the powerful functionalities of Artificial intelligence (AI) models such as LLMs without compromising on the swiftness or convenience that users expect from AI-driven automated systems. Thus, the present technology robustly integrates into the enterprise infrastructure, establishing a benchmark for security in the age of generative AI.

The present technology encompasses a methodology leveraging hidden overlay 265 and hidden underlay 290 techniques to modify data presented in a user's web browser 140 in real time without inducing perceptible latency or disrupting the end-user experience. These techniques function by integrating with the content rendering processes of the web browser 140 such that the modifications to display data occur beneath the layers directly interacted with by the user. With the implementation of various embodiments, unsecured data that may otherwise be prone to exposure is seamlessly altered to conform with security protocols before it is rendered for display.

In various embodiments, the hidden overlay 265 operates by creating a virtual layer on top of the actual webpage content as displayed in the browser 140. This layer is invisible to the user but serves as a dynamic barrier through which all data must pass before presentation. The hidden overlay 265 intercepts, examines, and if necessary, transforms data according to security policies before it reaches the user-visible layer. This process is analogous to a filter that ensures only secure content is made visible, thus preserving the confidentiality and integrity of sensitive information without altering the native look and feel or operational flow of the website.

In various embodiments, the hidden underlay 290 functions to protect the data from the bottom up. The hidden underlay 290 works by encapsulating the underlying data structure of the web page such that interactions leading to data display first pass through a security-centric processing step. This results in the real-time substitution or modification of data elements that may compromise privacy or security when rendered in their original form. The hidden underlay 290 is effectively a foundational security layer that operates beneath the surface of the webpage, making adjustments to the data before it is even requested for display.

In various embodiments, the hidden overlay 265 and the hidden underlay 290, while operating in a technically independent manner, are orchestrated to work in tandem. The hidden overlay 265 and the hidden underlay 290 dynamically interface with the page content, performing checks and modifications which are transparent to the user, thereby adhering to enterprise security standards without interrupting the continuous flow of the user's online activity. This ensures that the use and visual consistency of the web page remain unaffected even as potential threats or policy violations embedded within the content are mitigated in real time.

In various embodiments, notably, the functionality inherent to these revisions of data preserves the responsiveness and interaction expected by the end-user while visiting the web page. By utilizing this method, the present technology permits the navigation and use of web applications to proceed without any overt indication of the underlying security interventions. Moreover, these methods afford the enterprise an assurance of adherence to security policies across all user sessions enterprise-wide without the necessity for repetitive manual updates or modifications that could hinder efficiency and productivity.

In this context, in various embodiments, the hidden overlay 265 and the hidden underlay 290 exemplify a streamlined, unobtrusive method for real-time safeguarding of data within a user's browser, operating consistently and discreetly across diverse device types and browsing environments. This design abstracts the complexity of security enforcement away from the user, ensuring a secure yet unaffected browsing experience, while simultaneously preserving the enterprise's control and oversight of sensitive data handling procedures.

According to some embodiments the present technology provides a security solution that is universally compatible with a wide variety of Internet browsers (e.g., web browser 140). This is achieved through the deployment of JavaScript injection, which leverages JavaScript's broad support across multiple browser platforms. JavaScript, which is an integral part of web content development, is known for its consistent execution in a myriad of browser environments-across different operating systems and devices. For example, to facilitate the security functions of the present technology, a JavaScript code is crafted to interact with the browser's Document Object Model (DOM). When injected into the browser session, this code persists throughout the browsing session and can apply necessary security controls such as data validation, content modification, and user activity monitoring, in real-time. For example, uploading prompts to be filtered from the DOM.

Some embodiments utilize a dynamic configuration discovery system that circumvents the limitations of static or manual configuration methodologies previously employed to customize security settings for individual websites (e.g., website 220). Within this system lies an intricate mechanism that is responsible for autonomously determining the optimal security configuration for every website (e.g., website 220) accessed within the enterprise network.

According to some embodiments, use of the dynamic configuration discovery system begins when a user initiates a browser session and navigates to a website (e.g., website 220). Upon detecting the website access, the mechanisms engage in analyzing the structure and ascertainable configuration parameters of the website (e.g., website 220). For the purpose of this analysis, the present technology leverages a prime library database, a repository that comprises a comprehensive array of known configuration profiles corresponding to a multitude of websites.

Each profile within the prime library database is a composite of key-value pairs that together define the desired security configuration for a given website. These pairs may include variables such as permissible input types, secure data handling procedures, and script execution policies. These profiles are established based on prior analyses of websites and represent best-practice configurations that ensure compliance with the enterprise's security policies.

When a new website is encountered, the present technology discovery system retrieves the profiles from the prime library database and conducts a comparative assessment against the website's detected parameters. This process involves an algorithmic evaluation to identify a congruence between the characteristics of the website and the profiles within the library database. Factors such as the website's domain, structure, and the types of data exchanged are scrutinized to ascertain the appropriate security measures.

If a matching profile is found in the prime library database, the corresponding configuration is then automatically applied to the browser session. In scenarios where an exact match is not discovered, the system employs heuristic and machine learning techniques to derive a best-fit profile based on similarities to known website configurations. This derived profile is then used to dynamically configure the browser's security settings in real-time, without necessitating manual intervention or causing disruption to the end-user's experience.

To ensure the ongoing efficacy of this dynamic configuration discovery system, the present technology continually updates the prime library database. The present technology achieves such updates by learning from new encounters with websites and user interactions, thereby expanding its repository with newly discerned configurations. When a new or altered website's configuration is successfully implemented and validated against the security policies, this configuration is then incorporated into the prime library database. Thus, the system self-evolves, enhancing its future response capability with each website encountered.

Furthermore, when the user navigates to a different page within the same website, or to a wholly different website, the dynamic configuration discovery system reinitiates the comparative analysis process. It ensures that each webpage, regardless of whether it is a subsection of a larger site or an individual entity, receives a tailored security overlay conducive to the established security protocol.

In various embodiments, this dynamic configuration discovery system enables the real-time operability of the present technology. By effectively discovering and applying the configurations automatically, the system not only ensures seamless compliance with security measures but also significantly reduces the administrative overhead associated with manually maintaining the configurations of individual websites across an enterprise. The resultant streamlined and autonomous process is a component of the security architecture, providing robust, real-time defense mechanisms for enterprise-wide deployment of generative AI technologies.

FIG. 3 illustrates a high-level block diagram for securely using Artificial intelligence (AI) models by automatically injecting a security program using a proxy server, according to embodiments of the present technology. FIG. 3 provides an overview of the system architecture and the flow of data as it undergoes security enhancements through the injecting a security program (e.g., JavaScript injection process 305) facilitated by the proxy server 210.

In various embodiments, the system begins with a user (e.g., end user 105) initiating a browser session (e.g., using browser 140) on a client device (e.g., client devices 120). The client device (e.g., client devices 120) can be any computing device such as a personal computer, laptop, tablet, or smartphone. The user navigates to a website that utilizes Artificial intelligence (AI) models for providing AI-driven services.

As the user (e.g., end user 105) interacts with the website (e.g., website 220), the browser sends HTTP or HTTPS requests to the website's server (e.g., AI website server 310), according to various embodiments. These requests are intercepted by the proxy server 210, which sits between the client device (e.g., client devices 120) and the website's server (e.g., AI website server 310). The proxy server 210 plays a crucial role in the security architecture by acting as an intermediary that can modify the data flow to enforce security policies.

In various embodiments, upon intercepting the requests, the proxy server 210 injects a security program (e.g., JavaScript injection process 305). For example, JavaScript code is injected into the HTML content of the website (e.g., website 220) before it is delivered to the user's browser (e.g., browser 140) by the proxy server, according to various embodiments. This JavaScript injection process 305 is automatic and does not require any manual installation or intervention by the user. The injected JavaScript code is designed to operate seamlessly within the user's browser (e.g., browser 140), providing real-time security enhancements.

In various embodiments, once the JavaScript code is injected, it begins to monitor and interact with the user's browser session (e.g., using browser 140). The JavaScript code is responsible for intercepting unsecure AI input data 150 entered by the user into the website's input fields (e.g., input field 230). This interception allows the system to capture the data before it is transmitted to the AI model (e.g., AI website server 310), for processing.

In various embodiments, the intercepted unsecure AI input data 150 is then sent to a security Application Programming Interface (API) 245. The security API 245 communicates with security backend servers 240 and enforces an AI model input enterprise policy (by communicating with the security backend servers 240), which involves transforming the unsecure AI input data 150 into secure AI input data 260 by modifying it in real-time. This transformation ensures that any sensitive or non-compliant data is appropriately handled before being processed by the Artificial intelligence (AI) model such as an LLM (e.g., AI website server 310).

After the AI model processes the secure input data 260, the AI model generates unsecure AI output data 270, which is sent back to the user's browser (e.g., browser 140). The JavaScript code, still active within the browser session (e.g., using browser 140), intercepts this unsecure AI output data 270 before it is displayed to the user. The intercepted unsecure AI output data 270 is then sent to the security API 245, which enforces an AI model output enterprise policy. This policy involves transforming the unsecure AI output data 270 into secure AI output data 160 by modifying it in real-time, ensuring that any sensitive or non-compliant data is appropriately handled before being presented to the user. The secure AI output data 160 is then displayed to the user within the browser (e.g., browser 140), providing a seamless and secure user experience. Throughout this process, the JavaScript code operates transparently, ensuring that the user is unaware of the security enhancements being applied in real-time.

The present technology employs the use of the proxy server 210 that intercepts communications between the enterprise network and the destination servers according to various embodiments. During this communication is when JavaScript code is injected into the content before it reaches the end-user's web browser 140. Irrespective of a type of web browser 140, be it Chrome, Firefox, Safari, Edge, and the like, or any other browser, JavaScript maintains consistent functionality, effectively eliminating the need for different versions of the security code for different browsers.

In some embodiments, proxy server 210 is a central component that sits at the network layer and filters user traffic. For example, proxy server 210 intercepts HTTP or HTTPS requests and responses between the client devices and the AI website server. Proxy server 210 is responsible for injecting JavaScript code into the HTML content of the website 220 before the HTML content reaches the user's browser 140. This injection enables the enforcement of security policies and real-time data modification. Client devices 120 are the end-user devices, such as personal computers, laptops, tablets, or smartphones, that users utilize to access websites (e.g., website 220). Each client device runs a web browser (e.g., browser 140) through which users interact with AI-driven services on the website (e.g., website 220). In some embodiments, AI website server 310 (shown in FIG. 3) hosts the website (e.g., website 220) that provides AI-driven services using AI models. AI website server 310 processes user requests and generates responses based on the input data received from the client devices 120.

In some embodiments, the security API 245 is a component that enforces enterprise security policies on the data intercepted by the proxy server 210 by communicating with the security backend servers 240. The security API 245 processes both input data (unsecure AI input data 150) and output data (unsecure AI output data 270) to ensure compliance with security standards. The security API 245 transforms unsecure data into secure data by modifying it in real-time.

In some embodiments, the security backend servers 240 support the security API 245 by providing the necessary infrastructure and logic to enforce security policies. The security backend servers 240 may include databases, policy engines, and other components required to analyze and transform data according to enterprise security requirements.

In various embodiments in operation, when a browser session is initiated by a user within the enterprise network, the network traffic is routed through the proxy server 210 designated by the present technology. As the website content is requested and before it is rendered on the user's browser (e.g., web browser 140), the proxy server 210 intercepts the HTTP or HTTPS request. Instead of allowing the request to proceed directly to the destination server, the proxy server 210 injects JavaScript code into the body of the HTML content of the website response.

In some embodiments the injected JavaScript code is formulated to execute within the user's browser (e.g., web browser 140) upon page load, without requiring any user action or awareness. Its presence and function are transparent to the user, thereby maintaining the user experience while simultaneously enforcing the security measures as dictated by the enterprise. The JavaScript code operates consistently across various browsers due to the inherent compatibility of JavaScript as a language, allowing for a wide range of browser support without the need for specific adaptations or versions for different browser software.

Additionally in some embodiments, the injection of JavaScript is dynamic and can be adapted to the specific context of each website request. The proxy server 210 comprises logic that determines the necessary security script to inject based on the characteristics of the incoming request. This allows for tailored security measures that respond to the configuration or content of the requested website (e.g., website 220).

In some embodiments upon execution, the JavaScript operates with permissions that enable the JavaScript to monitor and control the page content, enforcing rules such as the removal of sensitive information, the transformation of data formats, and the blocking of content that violates predefined security protocols. Moreover, because the JavaScript is sourced from the proxy server 210, updates and modifications to the security policies can be made centrally, eliminating the need to push updates to each individual machine within the enterprise. The next time the browser sessions are initiated, the new or updated JavaScript code is automatically injected without any lag, providing immediate protection with the updated security measures.

Embodiments of the present technology enable rapid response to newly identified threats or operational changes by centralizing the management of security policies. The present technology eliminates the time-consuming process of manual browser extension installations across the multitude of devices on an enterprise network.

In various embodiments the proxy servers (e.g., proxy server 210) are strategically placed within the enterprise's network infrastructure to handle network traffic efficiently with minimal latency. The scalability of the present technology can be addressed by employing multiple proxy servers (e.g., proxy server 210), positioned either geographically or logically within the network, to distribute the load evenly and ensure that the performance impact on browser session responsiveness is negligible.

In some embodiments, the automatically injected JavaScript operates in synergy with the enterprise's existing security solutions, offering an additional layer of control and security that is both non-invasive and adaptive to the diversity of the modern web ecosystem. This method is in contrast to the traditional approach, which typically relies on continual manual intervention for the deployment and maintenance of browser-based security extensions. Thus, the present technology represents a significant improvement in the field, providing an automated, real-time solution to enterprise-wide security challenges posed by the use of generative AI technologies.

According to some embodiments, real-time modification of Artificial intelligence (AI) model input and output data is an aspect of ensuring control, privacy, and security in an enterprise environment. In this process is the use of a security Application Programming Interface (API), which enables analyzing and transforming data in accordance with enterprise policies.

In some embodiments, upon initiation of an Artificial intelligence (AI) model interaction by a user, the unsecured input data originating from the browser is not directly conveyed to the AI model. Instead, data paths are established such that this information is routed through the proxy server 210, wherein the security mechanism of the present system immediately engages. In real-time, without inducing perceptible delay, the input data is captured and forwarded to the security API.

According to embodiments, overall, FIG. 3 illustrates the system architecture and data flow involved in automatically injecting a security program (e.g., JavaScript injection process 305) for securely using Artificial intelligence (AI) models. By leveraging the proxy server 210 and a security API 245, the system ensures that both input and output data are intercepted, analyzed, and modified in real-time to comply with enterprise security policies, thereby mitigating the risks associated with the using sensitive information with Artificial intelligence (AI) models.

FIG. 4 depicts a process flow diagram for securely using Artificial intelligence (AI) models by automatically injecting a security program using a proxy server, according to embodiments of the present technology. FIG. 4 is a flowchart of an example method for a computer-implemented method for securely using Artificial intelligence (AI) models, the computer-implemented method comprising the following operations. FIG. 4 illustrates a comprehensive process for securing AI interactions within an enterprise environment. By leveraging the proxy server 210 and the security API 245, the automatically injecting a security program (e.g., JavaScript injection process 305) ensures that both input and output data are intercepted, analyzed, and modified in real-time to comply with enterprise security policies for using Artificial intelligence (AI) models such as LLMs.

According to some embodiments, step 410 includes automatically injecting a security program, using a proxy server, the automatically injecting the security program (e.g., JavaScript injection process 305) embedding code into HTML content of a website (e.g., website 220) enabling security for using Artificial intelligence (AI) models and the security program being automatically injected (e.g., JavaScript injection process 305) and not requiring manual installation, the security program comprising the following operations.

According to some embodiments, step 420 includes intercepting unsecure AI input data 150 from a user inputting data into an input field 230 of the website (e.g., website 220).

According to some embodiments, step 430 includes sending the unsecure AI input data 150 to a security Application Programing Interface (API) 245, the security Application Programing Interface (API) 245 enabling enforcing of an AI model input enterprise policy, the enforcing of the AI model input enterprise policy transforming the unsecure AI input data 150 to secure AI input data 260 by modifying the unsecure AI input data 150 in real-time.

According to some embodiments, step 440 includes intercepting unsecure AI output data 270 in response to the secure AI input data 260 being sent to a server of the website.

According to some embodiments, at step 450 includes sending the unsecure AI output data 270 to the security Application Programming Interface (API) 245, the security Application Programming Interface (API) 245 enabling enforcing of an AI model output enterprise policy, the enforcing of the AI model output enterprise policy transforming the unsecure AI output data 270 to secure AI output data by modifying the unsecure AI output data 270 in real-time.

In some embodiments, once the initial injection of the JavaScript code into the client browser session is successful using the injecting a security program (e.g., JavaScript injection process 305), the monitoring process transitions to an "off-network" functionality. This means that after the JavaScript is downloaded and executed on the client side, it does not require continuous network connectivity to the originating server to perform its security tasks.

According to some embodiments, during the off-network operation, the injected JavaScript engages in a variety of client-side actions without sending continuous requests to the proxy server 210. This is advantageous in multiple respects. Firstly, the approach reduces network load, thereby enhancing the overall performance of the enterprise's network infrastructure. This is particularly impactful in scenarios where network bandwidth is limited, or the proxy server 210 is under heavy load conditions. By shifting the processing burden onto clients, the embodiments inherently scales with the addition of users, as each operates independently once the initial injection is complete. Secondly, the off-network capability enhances privacy and security. Since sensitive data analysis and other processing activities occur directly on the client's machine, less potentially sensitive information traverses the network. This reduces the exposure and risk associated with data interception, man-in-the-middle attacks, or network breaches that capitalize on data in transit.

According to some embodiments, the off-network capability includes monitoring browser activities, enforcing pre-defined security policies, and modifying content-all without the need to communicate back to the proxy server 210 or any other networked systems. Notably, the injected script can programmatically access the local browser's document object model (DOM) and react to changes, making real-time adjustments to the page content according to pre-set rules. For instance, should the JavaScript identify content deemed unsecure or in violation of security policies, it can redact or alter this content instantly to comply with the established policies.

According to some embodiments, in implementation of the injecting a security program (e.g., JavaScript injection process 305), the initial injection process anchors the security script within the user session, providing it the requisite permissions to act autonomously. The script may, for example, store certain configuration parameters locally, or it may encrypt and cache sensitive actions to await batch processing later when a network connection to an enterprise server is available or during a scheduled interval.

According to some embodiments, the off-network functionality empowers the enterprise to maintain security protocols even when end-user devices are disconnected from the corporate network, such as when operating in offline mode or through an unreliable connection. This ensures that security is a pervasive attribute of the user's interaction with the enterprise resources, irrespective of their connectivity status.

According to some embodiments, the off-network capability built into the JavaScript injection flow exemplifies an advanced consideration for modern-day enterprise security needs. The off-network capability embodiments affirm the system's commitment to not only mitigating threats but also to optimizing network and computational resources while ensuring uninterrupted user experiences across diverse networking environments. The off-network capability of the technology represents a thoughtful integration of self-sufficient security practices anchored within the browser session, allowing enterprise-wide deployment of the security solutions to perform consistently and effectively regardless of individual clients' network connection statuses.

According to some embodiments the present technology relates to a computer-implemented method for securely using Artificial intelligence (AI) models such as large language model (LLMs), the computer-implemented method comprising: automatically injecting a security program (e.g., JavaScript injection process 305), using a proxy server 210, the automatically injecting the security program embedding code into HTML content of a website 220 enabling security for using Artificial intelligence (AI) models and the automatically injecting the security program being automatically injected and not requiring manual installation, the injecting the security program (e.g., JavaScript injection process 305) comprising: intercepting unsecure AI input data 150 from a user inputting data into an input field 230 of the website 220; sending the unsecure AI input data 150 to a security Application Programing Interface (API) 245, the security Application Programing Interface (API) 245 enabling enforcing of an AI input enterprise policy, the enforcing of the AI input enterprise policy transforming the unsecure AI input data 150 to secure AI input data 260 by modifying the unsecure AI input data 150 in real-time; intercepting unsecure AI output data 270 in response to the secure AI input data 260 being sent to a server of the website (e.g., AI website server 310); and sending the unsecure AI output data 270 to the security Application Programing Interface (API) 245, the security Application Programing Interface (API) 245 enabling enforcing of an AI output enterprise policy, the enforcing of the AI output enterprise policy transforming the unsecure AI output data 270 to secure AI output data 160 by modifying the unsecure AI output data 270 in real-time.

According to some embodiments, the modifying the unsecure AI input data 150 in real-time uses a hidden overlay, the hidden overlay being above a content layer of the website; further comprising displaying the secure AI input data 260 to the user using the input field 230 of the website and the hidden overlay.

According to some embodiments, the modifying the unsecure AI input data 150 in real-time comprises redacting personal identifiable information (PII) according to the AI input enterprise policy. For some organizations, the protection of Personal Identifiable Information (PII) is significant. The present technology incorporates sophisticated algorithms designed to identify and redact PII from data in transit and at rest. Redaction processes are executed in real-time, assuring that any data exposed during browser sessions remains anonymous and cannot be linked back to specific individuals. This feature not only protects privacy but additionally aids in conforming to various data protection regulations such as the General Data Protection Regulation (GDPR) and the California Consumer Privacy Act (CCPA).

According to some embodiments, the modifying the unsecure AI output data 270 in real-time uses a hidden underlay 290, the hidden underlay 290 being below a content layer of the website 220; further comprising displaying the secure AI output data 160 to the user using an output field (e.g., AI response text 285) of the website 220 and the hidden underlay 290.

According to some embodiments, the modifying the unsecure AI output data 270 in real-time comprises redacting AI output data according to the AI input enterprise policy.

According to some embodiments, the injecting the security program (e.g., JavaScript injection process 305) is live, in real-time.

According to some embodiments, further comprising dynamically discovering a configuration for each website (e.g., website 220) includes comparing a website configuration to a prime library database; and selecting a website configuration based on the comparing.

According to some embodiments, the proxy server 210 is configured to intercept and modify network traffic between the user and the server of the website (e.g., AI website server 310).

According to some embodiments, the security Application Programing Interface (API) 245 is configured to audit the unsecure AI input data 150 and the unsecure AI output data 270 for compliance with enterprise security policies.

According to some embodiments, the injecting the security program (e.g., JavaScript injection process 305) is configured to be updated automatically without user intervention.

According to some embodiments, the proxy server 210 is configured to log all interactions between the user (end user 105) and the server of the website (e.g., AI website server 310) for security auditing purposes.

According to some embodiments, the security Application Programing Interface (API) 245 is configured to detect and block malicious activities in real-time.

According to some embodiments, the injecting the security program (e.g., JavaScript injection process 305) is configured to provide real-time alerts to the user regarding potential security threats. Real-time alerts constitute a layer of the security framework. The system is designed to provide instantaneous notifications to designated personnel or systems when potential security incidents are detected. These alerts are tailored to be articulate and actionable, furnishing relevant details such as the time of occurrence, affected systems or data, and recommended remedial steps. By offering this capability, the system empowers rapid response and mitigation, critical to minimizing the window of vulnerability and limiting the impact of security threats.

According to some embodiments, the security Application Programing Interface (API) 245 is configured to generate reports on a security status of the AI input data and the AI output data.

According to some embodiments, the proxy server 210 is configured to provide load balancing for handling multiple user requests simultaneously.

According to some embodiments, the security Application Programing Interface (API) 245 is configured to perform real-time data analysis for detecting anomalies in the AI input data and the AI output data.

According to some embodiments, the security Application Programing Interface (API) 245 is configured to provide real-time feedback to the user regarding a security status of the AI input data and the AI output data.

According to some embodiments, the website (e.g., website 220) is an Artificial Intelligence (AI) website.

According to some embodiments, the modifying the unsecure AI input data 150 in real-time uses a hook procedure, the hook procedure intercepting an API call and altering the unsecure AI input data 150.

According to some embodiments, the modifying the unsecure AI output data 270 in real-time uses a hook procedure, the hook procedure intercepting an API call and altering the unsecure AI output data 270.

Some embodiments, incorporate a hook procedure as a component of the system to enable the real-time modification of unsecure Artificial intelligence (AI) model input data. This hook procedure is strategically designed to intercept Application Programming Interface (API) calls related to the processing or handling of AI input data. For example, in operation, when a user inputs data into a browser for interaction with a generative AI service, traditionally, the input data travels from the browser to the Artificial intelligence (AI) model unaltered. However, using the present technology, once a user initiates a session that necessitates the use of Artificial intelligence (AI) model generated outputs, and therefore has the potential to include sensitive data, the hook procedure becomes active and starts monitoring the API calls made by the browser or related services.

According to some embodiments, upon the identification of an API call that is designated for the AI model, the hook procedure intercepts this call prior to its arrival at the AI model. The interception serves as the juncture at which data can be reviewed and modified before further processing by the AI model. The examination of data at this point allows the system to apply predefined security policies that the enterprise has adopted. These security policies can include, but are not limited to, content filtering parameters, privacy settings, and requirements for data transformation before AI processing to ensure data protection and confidentiality.

According to some embodiments, after interception, the unsecure data is subjected to a series of transformations or sanitizations according to the predefined security policies.

The transformations may involve redacting Personal Identifiable Information (PII), obscuring sensitive enterprise-specific information, or applying other policy-based content adjustments. This process ensures that any sensitive content is protected and complies with the security standards and regulations pertinent to the enterprise.

According to various embodiments, the transformed secure data is then passed onto the generative AI service via the original API call pathways as if undergoing regular API call processes. When the Artificial intelligence (AI) model generates the output data based on the transformed input, the system is in a better position to maintain user privacy and adhere to data security policies. Furthermore, any potential real-time modifications to the output data can be similarly enforced through an equivalent hook procedure which ensures the security of outgoing information from the Artificial intelligence (AI) model.

According to some embodiments, in addition to directly editing the content of the data, the hook procedure is also equipped to collect metadata about the interactions, which could serve for auditing purposes and enable the enterprise to have detailed transaction logs. This metadata might include timestamps, user identifiers, and the nature of changes made to the data.

According to some embodiments, the hook procedure is a mechanism that allows the enterprise to retain control of data security and privacy without impinging upon the user experience. Users remain oblivious to the complexities of the data transformations taking place in the background, ensuring smooth and uninterrupted interaction with the AI services. Furthermore, the system's ability to conduct these processes in real-time is essential for maintaining high efficiency and responsiveness, which are vital in fast-paced enterprise environments.

The advantages of methods of the present technology are multifaceted. The present technology provides an enterprise with the assurance that all data, both input and output, are continuously monitored and modified in accordance with the latest security policies. It alleviates the burden of manual security updates, removes the latency of security implementations, and presents a minimal footprint on the user experience by maintaining real-time operations. Furthermore, the automatic nature of the injecting the security program (e.g., JavaScript injection process) via the proxy server eliminates the traditional vulnerabilities associated with individually managed browser extensions or plugins. Overall, the present technology presents a robust solution to the often complex challenge of maintaining enterprise security in the era of sophisticated AI applications.

FIG. 5 illustrates an exemplary computer system that may be used to implement security for using Artificial intelligence (AI) models by automatically injecting a security program using a proxy server, according to embodiments of the present technology. FIG. 5 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Where appropriate, the functions described herein can be performed in one or more of hardware, software, firmware, digital components, or analog components. For example, the encoding and or decoding systems can be embodied as one or more application specific integrated circuits (ASICs) or microcontrollers that can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. The various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the such as; the term "example" is used to provide exemplary instances of the item in discussion, not an exhaustive or limiting list thereof; the terms "a" or "an" should be read as meaning "at least one," "one or more" or the such as; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Hence, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other such phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

It is to be understood that the above description is intended to be illustrative, and not restrictive. For example, the above-described embodiments (and/or aspects thereof) may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. The Abstract of the Disclosure is provided to comply with 37 C.F.R. § 1.72 (b), requiring an abstract that will allow the reader to quickly ascertain the nature of the technical disclosure. It is submitted with the understanding that it will not be used to interpret or limit the scope or meaning of the claims. In addition, in the foregoing Detailed Description, various features may be grouped together to streamline the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

Thus, the technology of methods for securely using Artificial intelligence (AI) models such as large language model (LLMs) is disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method for securely using Artificial Intelligence (AI) models, the computer-implemented method comprising:
   automatically injecting a security program, using a proxy server, the automatically injecting the security program embedding code into HTML content of a website enabling security for using Artificial Intelligence (AI) models and the security program being automatically injected and not requiring manual installation, the security program comprising:
   intercepting unsecure AI input data from a user inputting data into an input field of the website;
   sending the unsecure AI input data to a security Application Programming Interface (API), the security Application Programming Interface (API) enabling enforcing of an AI model input enterprise policy, the enforcing of the AI model input enterprise policy transforming the unsecure AI input data to secure AI input data by modifying the unsecure AI input data in real time;
   intercepting unsecure AI output data in response to the secure AI input data being sent to a server of the website; and
   sending the unsecure AI output data to the security Application Programming Interface (API), the security Application Programming Interface (API) enabling enforcing of an AI model output enterprise policy, the enforcing of the AI model output enterprise policy transforming the unsecure AI output data to secure AI output data by modifying the unsecure AI output data in real time.

2. The computer-implemented method of claim 1, wherein the modifying the unsecure AI input data in real time uses a hook procedure, the hook procedure intercepting an API call and altering the unsecure AI input data.

3. The computer-implemented method of claim 1, wherein the modifying the unsecure AI output data in real time uses a hook procedure, the hook procedure intercepting an API call and altering the unsecure AI output data.

4. The computer-implemented method of claim 1, wherein the modifying the unsecure AI input data in real time uses a hidden overlay, the hidden overlay being above a content layer of the website; and
   further comprising displaying the secure AI input data to the user using the input field of the website and the hidden overlay.

5. The computer-implemented method of claim 4, wherein the modifying the unsecure AI input data in real time comprises redacting personal identifiable information (PII) according to the AI model input enterprise policy.

6. The computer-implemented method of claim 1, wherein the modifying the unsecure AI output data in real time uses a hidden underlay, the hidden underlay being below a content layer of the website; and
   further comprising displaying the secure AI output data to the user using an output field of the website and the hidden underlay.

7. The computer-implemented method of claim 6, wherein the modifying the unsecure AI output data in real time comprises redacting AI output data according to the AI model output enterprise policy.

8. The computer-implemented method of claim 1, wherein the security program is a JavaScript injection process, the JavaScript injection process being live, in real time.

9. The computer-implemented method of claim 1, further comprising dynamically discovering a configuration for each website including:
   comparing a website configuration to a prime library database; and
   selecting the website configuration based on the comparing.

10. The computer-implemented method of claim 1, wherein the proxy server is configured to intercept and modify network traffic between the user and the server of the website.

11. The computer-implemented method of claim 1, wherein the security Application Programming Interface (API) is configured to audit the unsecure AI input data and the unsecure AI output data for compliance with enterprise security policies.

12. The computer-implemented method of claim 1, wherein the security program is configured to be updated automatically without user intervention.

13. The computer-implemented method of claim 1, wherein the proxy server is configured to log all interactions between the user and the server of the website for security auditing purposes.

14. The computer-implemented method of claim 1, wherein the security Application Programming Interface (API) is configured to detect and block malicious activities in real time.

15. The computer-implemented method of claim 1, wherein the security program is configured to provide real-time alerts to the user regarding potential security threats.

16. The computer-implemented method of claim 1, wherein the security Application Programming Interface (API) is configured to generate reports on a security status of AI input data and AI output data.

17. The computer-implemented method of claim 1, wherein the proxy server is configured to provide load balancing for handling multiple user requests simultaneously.

18. The computer-implemented method of claim 1, wherein the security Application Programming Interface (API) is configured to perform real-time data analysis for detecting anomalies in AI input data and AI output data.

19. The computer-implemented method of claim 1, wherein the security Application Programming Interface (API) is configured to provide real-time feedback to the user regarding a security status of AI input data and AI output data.

20. The computer-implemented method of claim 1, wherein the website is an Artificial Intelligence (AI) website.

21. The computer-implemented method of claim 1, wherein the modifying the unsecure AI input data in real time uses a hook procedure, the hook procedure intercepting an API call and altering the unsecure AI input data.

22. The computer-implemented method of claim 1, wherein the modifying the unsecure AI output data in real time uses a hook procedure, the hook procedure intercepting an API call and altering the unsecure AI output data.

23. A computer-implemented method for securely using Artificial Intelligence (AI) models, the computer-implemented method comprising:

automatically injecting a JavaScript injection process, using a proxy server, the JavaScript injection process enabling enterprise-wide security for using Artificial Intelligence (AI) models and the JavaScript injection process being automatically injected and not requiring manual installation, the JavaScript injection process comprising:

intercepting unsecure AI input data, using the proxy server, from a user inputting data into an input field of an Artificial Intelligence (AI) website;

sending the unsecure AI input data to a security Application Programming Interface (API), the security Application Programming Interface (API) enabling enforcing of an AI input enterprise policy, the enforcing of the AI input enterprise policy transforming the unsecure AI input data to secure AI input data by modifying the unsecure AI input data in real time;

intercepting unsecure AI output data, using the proxy server, in response to the secure AI input data being sent to a server of the Artificial Intelligence (AI) website; and sending the unsecure AI output data to the security Application Programming Interface (API), the security Application Programming Interface (API) enabling enforcing of an AI output enterprise policy, the enforcing of the AI output enterprise policy transforming the unsecure AI output data to secure AI output data by modifying the unsecure AI output data in real time.

\* \* \* \* \*